This invention relates to cementing casing in wells. More particularly, it relates to an apparatus and method for preventing leakage between the casing and cement outside the casing.

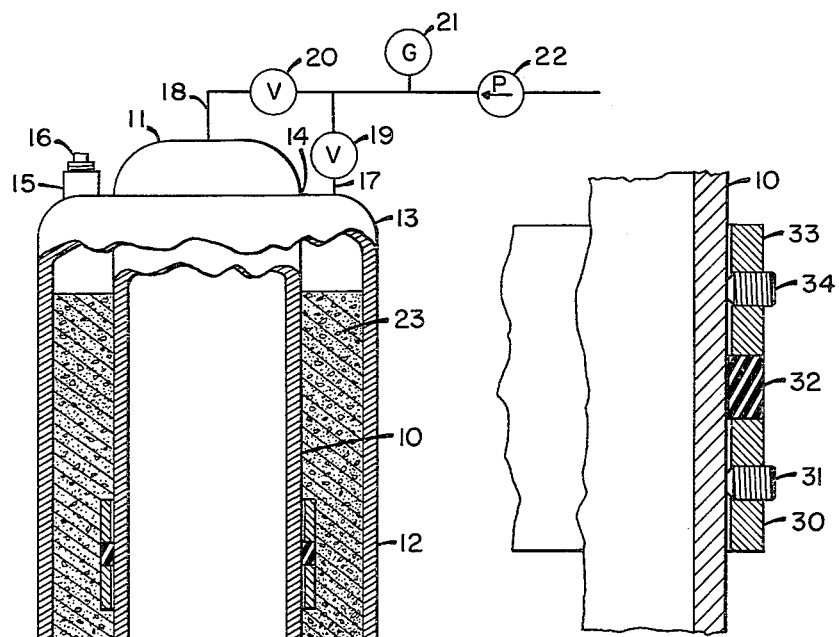
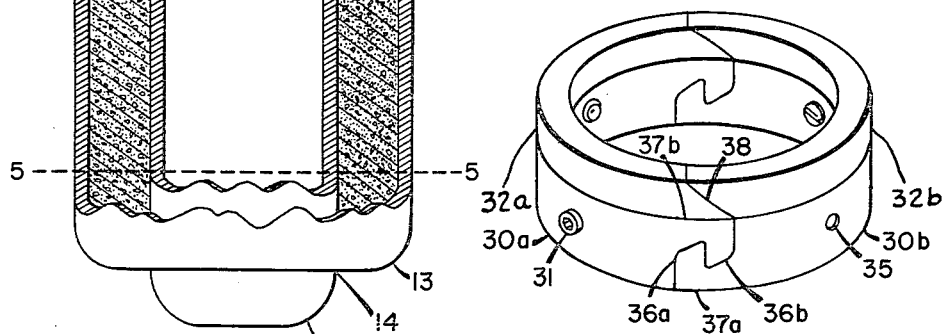
FIG. 1 FIG. 2 FIG. 3
JAMES W. SPURLOCK
CARL R. HOLMGREN
WILLIAM G. BEARDEN
INVENTORS 3,110,346
SEAL FOR CASING CEMENTED IN WELL
James W. Spurlock, Carl R. Holmgren, and William G. Bearden, Tulsa, Okla., assignors to Pan American Petroleum Corporation, Tulsa, Okla., a corporation of Delaware
Filed Dec. 27, 1960, Ser. No. 78,622
7 Claims. (Cl. 166—21)

Cement is frequently placed outside of steel casing in a well to seal the space between the formation and the casing. That this seal is frequently not all that might be desired may be indicated by a simple test. The casing may be perforated at two levels in the well, say 10 feet apart. One set of perforations can then be isolated by use of a straddle packer run on a string of tubing. If a fluid is injected under pressure through this isolated set of perforations, the fluid often appears quickly at the other set of perforations. This indicates that there is leakage past the cement seal.

It was considered possible that much of the leakage might be occurring through cracks formed in the cement by the perforating operation. It was also considered possible that the blast or pressure surge created by the perforating equipment might break the bond between the cement and casing and form a channel through which leakage might occur. In a preliminary series of tests in the laboratory it was shown that the principal leakage was in a channel between the cement and casing. The surprising discovery also was made that this channel seemed to form whether the casing was perforated or not. Apparently, there is enough flexing of the casing by externally applied pressure to break the bond of the cement to the casing and permit leakage through the resulting channel.

An object of this invention is to provide a method for preventing leakage of fluids outside the casing through a channel between the cement and casing. Another object is to provide a seal which will prevent leakage along this channel. Other objects will be apparent from the following description and claims.

In general, we have found that an effective seal between the casing and cement can be formed by use of a combination of a rigid flange around the casing and a gasket of resilient material, such as soft rubber. Preferably, the flange is solidly fixed or attached to the casing. Also preferably, a second flange, which may be termed a floating flange, is placed on the other side of the gasket from the fixed flange. This floating flange is preferably fixed only loosely to the casing, if at all. We have found that by use of this simple combination a seal can be formed which resists leakage at pressure differentials up to values which cause cement failure or casing collapse.

The invention will be better understood from consideration of the drawing in which:

FIGURE 1 is a view in vertical cross-section of the laboratory apparatus used in making the tests which resulted in this invention;

FIGURE 2 is a view in cross-section of the preferred form of fixed flange, gasket and floating flange applied to a casing;

FIGURE 3 shows an isometric view of a preferred form of fixed flange modified to carry one possible form of the gasket bonded to the flange.

Referring now to the figures of the drawing in more detail, in FIGURE 1, the testing equipment includes an inner casing 10, 5½ inches in diameter. This casing is closed on both ends by heads 11. This inner casing is surrounded by an outer casing 12, which is 8⅝ inches in diameter. Ends 13 on casing 12 are welded to inner casing 10 at 14. In the top cap of outer casing 12 a collar 15 passing through the cap is provided. This collar is sealed by plug 16. Also welded through the top end caps of casings 12 and 10 are small tubes 17 and 18, respectively, through which flow can be controlled by valves 19 and 20, respectively. The pressure in these lines is measured by gauge 21. Pump 22 forces a fluid through lines 17 and 18 into the annular space between casings 10 and 12, or inside of casing 10, or both into the annular space and inside the inner casing to impose a pressure within these chambers.

In operation of the testing equipment, a slurry of Portland cement and water is added to the annular space through collar 15. Plug 16 is then screwed in and pump 22 is operated to impose a pressure on the cement through valve 19 and line 17 while the cement slurry is setting to form concrete 23, as shown in FIGURE 1. Pressure may sometimes also be applied inside casing 10 during this period. After the cement has set for about 72 hours, the bottom of the apparatus is sawed off at dashed line 5—5. Pump 22 is then operated to impose increasing pressure as indicated by gauge 21 in the annular space above the cement. The lower sawed off end of the apparatus is observed to determine when a leak develops between the cement and inner casing.

When the effects of gaskets, flanges, or the like are tested in the apparatus of FIGURE 1, these are placed on the inner casing 10 before it is enclosed by outer casing 12. The procedure of filling the annular space with cement slurry, allowing it to set and determining the pressure to cause leakage between the casing and cement, can then be followed as just described.

FIGURE 2 shows a preferred form of such a gasket and flange combination. In this combination, a stop collar 30 with set screws 31 is fixed to the casing by tightening the set screws. A more detailed drawing of the stop collar is shown in FIGURE 3. A gasket 32 of resilient material, such as soft rubber, is placed in contact with the surface of the stop collar at right angles to the casing. Another stop collar 33 with set screws 34 is then added on the end of the gasket opposite the one adjacent the flange fixed to the casing. The set screws in this second stop collar are preferably tightened slightly to prevent the stop collar from sliding freely on the casing, but not sufficiently to prevent movement relative to the casing if any considerable force is applied.

In FIGURE 3, half 30A of the stop collar is shown as containing set screws 31. Half 30B may also carry set screws, but ordinarily permanent locking buttons 35 are fixed in this half of the collar. The two halves lock together around the casing due to engagement of dogs 36A and 36B on arms 37A and 37B of halves 30B and 30A, respectively. Preferably, gasket 32 is split into the two halves 32A and 32B in a bevelled manner, as shown at 38 in FIGURE 3. Each half of the split gasket is bonded to half of the stop collar, as shown. This bonding may be by a vulcanizing process, or it may be by use of any of the many rubber cements now available.

Using the equipment shown in FIGURE 1, tests were run using straight, smooth pipe and also using flanges and gaskets separately and in combination. Results are presented in the following table. In all tests, the cement slurry was set under about 4500 pounds per square inch pressure. In some, the inner casing was also pressured while the cement was setting. In others, it was not pressured, as indicated in the table.

| Test No. | Fixed Flange | Floating Flange | Gasket | | | Pressure in Casing, p.s.i. | Leak Press., p.s.i. |
|---|---|---|---|---|---|---|---|
| | | | No. | Material | Durometer Hardness | | |
| 1 | 0 | 0 | 0 | | | 4,500 | 2,500 |
| 2 | 0 | 0 | 0 | | | 0 | 3,100 |
| 3 | 3 welded | 0 | 0 | | | 0 | 4,000 |
| 4 | 0 | 0 | 1 | Tread Gum, Raw | 30-40 | 0 | 4,100 |
| 5 | 0 | 0 | 3 | Treat Gum, Vulcanized | 60-70 | 4,500 | 4,500 |
| 6 | Shallow Grooves | 0 | 3 | Neoprene O-rings | 70-80 | 4,000 | 4,300 |
| 7 | 1 welded | 0 | 1 | do | 70-80 | 4,500 | 4,500 |
| 8 | do | 1 Ring | 1 | Epoxy | 90-95 | 4,500 | 4,500 |
| 9 | do | do | 1 | Silicone Rubber | 30-40 | 0 | 5,000 |
| 10 | do | do | 1 | do | 30-40 | 4,500 | 6,500 |
| 11 | 1 Pipe Collar | do | 1 | EC-801 | 50-60 | 0 | 6,500 |
| 12 | do | do | 1 | EC-801 | 50-60 | 4,500 | 5,500 |
| 13 | do | do | 1 | Silicone Rubber | 30-40 | 4,500 | [1] 5,500 |
| 14 | do | do | 1 | EC-801 | 50-60 | 0 | [1] 5,000 |
| 15 | 1 Stop Collar | 1 Stop Collar | 1 | EC-801 | 50-60 | 0 | 6,500 |
| 16 | 1 Pipe Collar | do | 1 | EC-801 | 50-60 | 0 | 6,500 |
| 17 | do | 2 Rings [2] | 2 | Tread Gum, Raw [2] | 30-40 | 0 | 6,700 |
| 18 | 3 welded | 3 Rings | 3 | Silicone Rubber | 30-40 | 4,500 | 6,000 |

[1] Pressure applied from pipe collar and opposite floating flange.
[2] One floating flange and one gasket below, other set above pipe collar.

In the table, tests 1 and 2 show the pressure at which a leak occurred between the 5½ inch casing and the cement when no flanges or gaskets were present. The tests differ only in the pressure which was imposed inside the 5½ inch casing while the cement was setting. In none of the reported tests was a pressure imposed inside the casing while testing for a leak outside the casing. This was thought to best duplicate field conditons where the casing pressure is reduced to cause the well to produce.

Test 3 demonstrates the effects of using flanges alone without gaskets. The increased pressure required to cause leakage between the casing and cement may be due to at least 3 causes. First, the flanges welded to the casing strengthened it and thus minimized flexing of the casing when pressure was applied around it. Second, the flanges provided a tortuous path for flow of fluids along the outside of the 5½ inch casing, thus increasing the resistance to flow. Third, the flanges provided shoulders against which the cement could press in case of any relative axial movement between the cement and casing. The pressure of the cement against a shoulder does, of course, provide a seal of sorts.

The results of tests 4 and 5 illustrate the effects of applying gaskets without flanges to the outside of the 5½ inch casing. Test 6 is a similar test, using O-rings and very shallow grooves on the outside surface of the casing. The unsupported gaskets and O-rings produced some improvement in results. Upon examining the gaskets and O-rings at the end of the test, however, they were found to be badly deformed.

In test 7, an O-ring was backed up by a flange welded to the outside of the 5½ inch casing. Obviously, the combination of gasket and fixed flange produced better results than either the O-ring or flange alone. Although a floating flange was not used in this test, the results were as good as those in tests 9 and 14, for example, where a floating flange was used. Test 14 may not, however, be altogether comparable to test 7 for reasons explained later.

In the remaining tests, from 8 to 18 inclusive, both a fixed flange and a floating flange were used. Sometimes the fixed flange was a ring of steel welded to the outside of the 5½ inch casing. Sometimes the fixed flange was simply a pipe collar. Sometimes the fixed flange was a stop collar which had been tightened to fix it securely to the outside of the 5½ inch casing. All seemed to perform about equally well. The floating flange was usually a ring of steel fitting loosely around the 5½ inch casing. In tests 15 and 16, however, the floating flanges were stop collars which were only loosely secured to the casing above the gaskets. Again, both forms worked about equally well.

Test 8 shows the effects of using a gasket of material having a hardness a little beyond the upper limit which should be observed for our purposes. The gasket material in this case was an epoxy resin catalyzed by a polyamide resin prepared by condensing polymerized linoleic acid with a polyamine, such as diethylene triamine. A high ratio of epoxy to polyamide was used to give a Shore durometer hardness of a little over 90 as measured by ASTM test D676-58T. This material was still resilient and elastic in the sense that it could be compressed without shattering and would slowly return to approximately its original shape when the compressing force was released. The results of the test show, however, that the material was a little too hard for our purposes.

A comparison of the results of tests 9 and 10 apparently shows the effects of imposing a pressure on the inside of the casing while the cement is setting. Tests 11 and 12 using another gasket material should show this same effect. Actually, it is to be noted that the results are reversed in the two sets of tests. That is, in tests 9 and 10 the best results were obtained when a pressure was maintained in the casing while the cement outside the casing was setting. In tests 11 and 12 the opposite is true. The explanation apparently is that if the casing cement channel can be sealed to withstand a pressure of about 5000 pounds per square inch, then failure is usually due to failure of the cement, collapse of the casing, or the like. These are factors which will vary principally with the strength of the cement and quality of the casing. They have little to do with the quality of the seal. For example, test 10 ended when a large piece of cement exploded from the open end of the test equipment due to fracturing of the cement under 6500 pounds per square inch pressure. In test 16, the casing definitely collapsed. This is not surprising since the specified collapse pressure of the casing is 4500 pounds per square inch.

The point is that the combination of fixed flange, gasket and floating flange formed a seal between the casing and cement which was good enough to cause something else to fail first as long as the gasket was a resilient material within the proper range of hardness. Any differences in failure pressures above about 5000 pounds per square inch should not, therefore, normally be used as a basis for comparing qualities of the various seals.

As shown in test 8, a Shore durometer hardness of 90 was a little too great. Test 9 with the silicone rubber and test 17 with the raw tire tread gum rubbers showed that a Shore durometer hardness of 30 to 40 was adequate. These materials, however, were near the minimum limit of hardness which could be used since they deformed rather readily with only a small application of pressure. Somewhat softer materials might be used in some cases, but ordinarily the gasket material should have a Shore durometer hardness of at least about 20, as measured by ASTM test D676. The results of test 7 with the neoprene O-ring, tests 9 and 10 with the silicone rubber, and tests 11 and 12 with the synthetic rubber EC–801 show that many types of gasket materials can be used provided they are resilient materials within the specified range of hardness.

The silicone rubber is preferred as a gasket material principally because of the wide temperature range over which it can be used. Another advantage is that it can be preformed as a gasket ring or formed in place on the casing. For example, the fixed and floating flanges can be arranged on the casing and the silicone rubber base plus a polymerizing catalyst can then be mixed and used to fill the space between the flanges to form the gasket in place on the surface of the casing.

A comparison of tests 10, 11 and 15 shows that many forms of fixed flanges may be used including rings welded on the casing, pipe collars, and stop collars. The same tests show that if a floating flange is used, it may be simply a loose-fitting ring or a stop collar.

The welded flanges and the floating flanges, other than the stop collars and pipe collars, were cut from steel plate $3/16$ to $1/4$ inch thick. Some were cut to extend as little as $3/16$ inch outwardly from the surface of the casing. In other tests, they extended as much as 1 inch outwardly. The stop collars were $1/4$ inch thick; that is, the difference between internal and external diameter was about $1/4$ inch. Their internal diameter was about $1/16$ to about $1/8$ inch larger than the external diameter of the casing. Their outer surfaces were, thus, about $5/16$ to about $3/8$ inch from the surface of the casing when they were set in place on the casing. The stop rings were about $1\frac{1}{2}$ inches long; that is, they extended about $1\frac{1}{2}$ inches along the casing. The pipe collars were standard collars for 17 pounds J–55 casing. While the stop collars as just described are operative for our purposes, as shown by the tests, it is preferred that somewhat less clearance be allowed between the stop rings and casing. A better support is thus provided for the gasket or gaskets.

The flanges should be as strong and rigid as possible in order for the fixed flange to give good support to the gasket and the floating flange to apply the pressure uniformly to the gasket. It will be apparent, however, that any flange stronger than the gasket itself will provide some support or give some distribution of applied pressure. While steel is greatly preferred as the flange material, it will be apparent that other materials may be used. Examples include metals such as aluminum, alloys such as brass, and nonmetallic materials such as solid plastics reinforced with glass fibers.

Test 7 shows that in one of the less desirable embodiments a floating flange need not be used at all. Test 15 shows that the floating flange need not float freely since it was tightened to an extent sufficient to prevent its being easily moved along the pipe. Other tests in which the floating flange was lightly attached to the casing were tests 13 and 14. In these cases, it was proposed to pressure the annular space above the cement from the fixed flange end. Therefore, the floating flange and gasket were placed below the fixed flange. To prevent the floating flange from falling to the bottom of the annular space while the cement slurry was being added and being permitted to set, this floating flange was tacked to the casing by welding at a few small spots. The results of tests 13 and 14 show that the seal was effective when pressured from the fixed flange end.

The explanation of the sealing action which was obtained in tests 13 and 14 is not completely certain. It involves, of course, the whole theory of the functions of the fixed flange, gasket and floating flange. We believe that when the gasket is subjected to pressure, as it is in a well while the cement is setting, the gasket is compressed by the hydraulic pressure. Then, when the pressure is released, as by perforating the casing, and reducing the pressure to cause the well to produce, the compressed gasket tends to expand into any channels leading to the low pressure zone. With these channels sealed, the gasket has applied to it on one side the pressure of any fluids attempting to leak to the low pressure zone. On the other side, the gasket has applied to it the low pressure of the low pressure zone. The result is a squeezing action which tends to force the gasket still farther into the possible leakage channels. The result is much the same as when an O-ring is used to form a pressure seal. The larger the pressure differential across the gasket, the larger is the sealing force.

If this theory is correct, it accounts for the improved results observed when a gasket is used in the absence of a flange. As previously noted, however, the gasket in such cases becomes badly deformed due to the poor support of the cement and also the nonuniform application of pressure through channels around the casing. As shown in the tests using gaskets without flanges, the deformed gaskets usually quickly lose their sealing ability. We believe that the fixed flange serves as a solid uniform base against which the gasket can be compressed. The improved results are apparent in test 7. The pressure is apparently still applied to the gasket nonuniformly, however; that is, the fluid apparently does not channel uniformly along the casing, but reaches the gasket in one or more points or small areas. Thus, a gasket supported by a fixed flange may still be deformed to at least some degree. The floating flange appears to serve as a means for distributing forces more uniformly to the gasket.

Returning now to the results in tests 13 and 14 where the pressure was applied from the fixed flange end, it seems probable that the floating flange, supported as it was by the cement, acted as a fixed flange with respect to the gasket. The result was that this floating flange provided the necessary support for the gasket to permit a good seal to be established and maintained until the cement failed. If this theory is correct, the pipe collar had little effect on the sealing operations in these tests.

While the above theories seem to explain the results which have been observed, we do not, of course, wish to be bound by these theories. Whatever the correct theories may be, it is apparent from tests 13 and 14 that when the preferred combination of a fixed flange, gasket and floating flange is cemented in place, a seal is formed regardless of the direction from which the pressure is applied.

The arrangement used in test 17 may be employed if there is some uncertainty regarding the direction from which pressure will be applied and if the full advantages of the fixed and floating flanges are to be obtained. In this case, a gasket and a floating flange were placed both above and below the fixed flange, which in this instance was a pipe collar. Obviously, the results were excellent even though a rather soft rubber was used as a gasket. One advantage of this system should be mentioned since it is not immediately apparent. This advantage occurs when there is relative movement of the casing up or down with respect to the cement which surrounds it. For example, a packer may be set on tubing in the well and then a strain may be taken in the tubing. This tends to cause movement of the casing with respect to the cement. A more common example is an acidizing or hydraulic fracturing operation through perforations. The perforating operation ordinarily cracks the cement at the level of the perforations. The cracks expose an annular surface of cement to pressure imposed through the perforations. If this is a high pressure as in a fracturing operation, the cement tends to act like an annular piston and moves along the casing. In any case where such relative movement takes place and a floating flange and gasket are placed on both ends of the fixed flange, one of the gaskets will be strongly compressed between the fixed and floating flanges. In the laboratory tests in cases where the pressure was sufficient to cause the annular cement piston to move along the casing, the gasket material was sometimes extruded up behind the floating flange and into the space between the casing and cement. This extruded gasket material was frequently held so tightly between the casing and cement that it remained permanently in this channel even after the pressure was removed.

It will be apparent that it will sometimes be advisable to impose a pressure through casing perforations to extrude the gasket material into possible fluid flow channels as well as for other purposes, such as acidizing, hydraulic fracturing, or the like. In such cases, it may be helpful to have gaskets and floating flanges on both ends of fixed flanges, as in test 17, so that wherever the perforations are placed, and whether the casing moves up or down with respect to the cement at least one of the gaskets will be strongly compressed when pressure is applied through the perforations. If a pressure is to be applied through the perforations to extrude the gaskets into flow channels, this pressure should ordinarily be at least about 500 pounds per square inch above the normal pressure at the perforations if any appreciable extrusion is to occur. The pressure at the perforations should not be more than about 5000 pounds per square inch above the normal pressure to avoid the danger of causing the cement to fail.

As previously noted, tests 15 and 16 were designed principally to determine the suitablility of stop collars as fixed and floating flanges. The results show that these collars are suitable for both purposes. These devices are sometimes referred to as stop rings. Several suitable designs are available on the market.

Test 18 shows the effects of using a multiplicity of fixed flanges, gaskets and floating flanges. The results seem no better than those obtained using a single set of flanges and gaskets. This shows again that if one of the sets makes a seal, something else gives way before the seal does. In this case the cement fractured. In practice, the use of a multiplicity of flange and gasket sets is generally advisable not only in cases where it is uncertain exactly where the perforations are to be made, but in all cases. The reason is that in spite of the turbulence caused by the flanges when cement is pumped past them, a mud inclusion, air bubble, or the like may occur at the level of one of the flange and gasket combinations. The gasket can hardly be expected to seal off such large passages. However, if a multiplicity of the combinations is used, a good cement fill will almost certainly be obtained opposite at least one of them. As previously explained, one good seal is all that is required.

In order to insure good cement fill around the flanges and gaskets, it is recommended that casing centralizers be used in the zone where the flanges and gaskets are mounted. Wall scratchers should also be used in these zones since it will be apparent that there is little point in sealing the channel between the casing and cement if a good contact is not obtained between the cement and formation.

If a casing with collars is used, a gasket and floating flange can be placed above, below or both above and below each casing collar, this collar serving as the fixed flange. In all cases, the thickness of the gasket and floating collar, that is the distance they extend out radially from the casing, should be about that of the fixed flange. If a pipe collar is used, then the gasket and floating flange should extend outwardly about the same distance as the casing collar. If other forms of fixed flanges are used, other thicknesses are possible. A thickness of as little as 3/16 inch as been effective. A thickness of as little as 1/8 inch should produce some sealing effects. The maximum thickness will depend somewhat upon the difference between the diameter of the casing and the diameter of the well. In most wells a thickness of more than about 1/2 inch will not be advisable. Preferably, the thickness should be about 1/4 to about 3/8 inch.

The length of the gasket along the casing preferably should not be shorter than about 1/4 inch to provide a sufficient volume of gasket material to form an effective seal. The length should not be longer than about 2 inches to avoid the danger of wrinkling and distortion of the gasket material. Preferably, the length should be about 1/2 to 1 inch.

Flange and gasket assemblies may be placed along the entire length of the casing to be cemented in the well. Ordinarily, however, they are required only between zones where no communication is desired. The number of assemblies may be equal to the number of pipe collars in the zone or zones of interest. Since these collars are ordinarily about 30 feet apart, however, it will generally be desirable to place one or more assemblies between the pipe collars. If narrow zones of gas, oil and water are closely associated, the assemblies may be placed as little as 1 foot or so apart. Ordinarily, however, a spacing of 5 to 10 feet will be adequate and a spacing within this range is preferred. While casing collars are preferred as fixed flanges when available at the desired location, stop collars are usually preferred since they can be placed at any point on the casing.

The gasket may be applied to the casing in several ways. In any case it should be in tight contact with the casing and preferably bonded to it. If the gasket is formed in the shape of a continuous ring, like the O-ring in test 7, it can be made slightly smaller in diameter than the external diameter of the casing. In this way, the hydraulic pressure will tend to compress the gasket against the casing rather than getting under the gasket and compressing it away from the casing. If the gasket ring is split, as shown in FIGURE 3, for example, it is preferable to apply a little rubber cement between the casing and gasket to insure a good bond between the gasket and casing. When the gasket is said to be in firm contact with the casing, it will be understood that it may be merely physically pressed against the casing, or it may be bonded to the casing by vulcanizing, use of rubber cement, or the like.

In the preferred use of this invention in cementing casing in wells, the casing is lowered into the well as usual. As the portion of the casing which will be opposite the part of the well in which a good seal is essential is lowered into the well, rubber cement is applied above and below each collar and one of the assemblies shown in FIGURE 3 is attached above and below the collar. In each case the gasket is turned toward the pipe collar. The set screws or other tightening devices on the stop collars are then used to make sufficient contact with the casing to prevent sliding of the stop collar along the casing unless a considerable force is applied. In addition to these assemblies, others are attached between the pipe collars. In each of these locations an ordinary stop collar is firmly attached to the casing and the stop collar and gasket assemblies, as shown in FIGURE 3, are placed above and below the fixed stop collar in the same manner as at the pipe collars. Preferably, the assemblies are placed about 5 to 10 feet apart along the casing, and wall scratchers and centralizers are also attached to the casing in this zone. The casing is then lowered into the well and cemented in place as usual. Perforations are then formed in the casing opposite the producing zone. Preferably, a high pressure is then applied through these perforations to compress gaskets above and below the perforations and extrude the gasket materials into the fluid flow channels. The well can then be placed on production.

It will be apparent that at locations other than the pipe collars, the stop collars with gaskets attached may be used as the fixed flanges and the ordinary stop collars may be used as the floating flanges. In this case, it may be desirable to bond a gasket on both ends of the stop collar used as a fixed flange. Any stop collar with at least one gasket attached may be used as the combination fixed flange and gasket with or without a floating flange.

A gasket attached to a stop collar may have the same internal diameter as the stop collar. The space between the gasket and casing can then be filled with a rubber cement to bond the gasket to the casing. Preferably, however, the gasket has an internal diameter slightly smaller than that of the stop collar and slightly smaller than the external diameter of the casing to which it is to be applied. With this arrangement, when the stop collar and gasket are applied to the casing, the gasket is pressed into firm contact with the casing whether a rubber cement is used or not.

We claim:
1. A method for cementing a casing in a well comprising placing in firm contact with said casing adjacent a fixed flange around said casing a gasket of resilient material having a Shore durometer hardness between about 20 and about 90, said gasket being between about ⅛ and about ½ inch thick and between about ¼ and 2 inches long, lowering said casing with said gasket and flange thereon into said well and introducing cement between said casing and the well wall at least at the level of said gasket to surround said casing, flange and gasket, whereby a seal is formed between said casing and cement to prevent flow of fluids between said cement and casing.

2. A method for cementing a casing in a well comprising placing in firm contact with said casing adjacent a fixed flange around said casing a gasket of resilient material having a Shore durometer hardness between about 20 and about 90, said gasket being between about ⅛ and about ½ inch thick and between about ¼ and about 2 inches long, placing a rigid floating flange adjacent said gasket on the end opposite said fixed flange, lowering said casing with said gasket and flanges thereon into said well and introducing cement between said casing and the well wall at least at the level of said gasket to surround said casing, flange and gasket, whereby a seal is formed between said casing and cement to prevent flow of fluids between said cement and casing.

3. The method of claim 1 in which said gasket material is silicone rubber bonded to said casing.

4. The method of claim 2 in which said gasket material is silicone rubber bonded to said casing.

5. The method of claim 2 in which the cement is permitted to set, the casing is then perforated near said gasket and a pressure between about 500 and about 5000 pounds per square inch above normal formation pressure at the level of the perforations is applied through the perforations, whereby said gasket is extruded into any flow channels between the casing and cement, thus forming a more effective seal.

6. An article of manufacture comprising a stop collar having bonded to at least one end thereof a gasket of resilient material having a Shore durometer hardness of from about 20 to about 90, said gasket being from about ⅛ to about ½ inch thick and from about ¼ to about 2 inches long.

7. The article of manufacture of claim 6 in which said gasket has an internal diameter less than that of said stop collar and less than the external diameter of the casing to which it is to be applied, whereby the gasket is pressed into firm contact with said casing when said stop collar is placed around said casing.

References Cited in the file of this patent

UNITED STATES PATENTS

| | | |
|---|---|---|
| 1,594,448 | Boynton | Aug. 3, 1926 |
| 1,687,424 | Boynton | Oct. 9, 1928 |
| 1,980,942 | Manning | Nov. 13, 1934 |

FOREIGN PATENTS

| | | |
|---|---|---|
| 986,619 | France | Nov. 25, 1943 |